No. 871,649. PATENTED NOV. 19, 1907.
F. STREICH.
LONG LOAF MOLDING MACHINE.
APPLICATION FILED APR. 19, 1906.

2 SHEETS—SHEET 1.

Witnesses:
John Braunwalder
R. B. MacIntosh

Inventor:
Frank Streich
By Frederick Benjamin
Att'y.

No. 871,649. PATENTED NOV. 19, 1907.
F. STREICH.
LONG LOAF MOLDING MACHINE.
APPLICATION FILED APR. 19, 1906.

2 SHEETS—SHEET 2.

Witnesses:
John N Braunwalder
R. B. MacIntosh

Inventor:
Frank Streich
By Frederick Benjamin
Att'y.

UNITED STATES PATENT OFFICE.

FRANK STREICH, OF JOLIET, ILLINOIS, ASSIGNOR, BY MESNE ASSIGNMENTS, TO CHAMPION MACHINERY COMPANY, OF JOLIET, ILLINOIS, A CORPORATION OF ILLINOIS.

LONG-LOAF-MOLDING MACHINE.

No. 871,649.      Specification of Letters Patent.      Patented Nov. 19, 1907.

Application filed April 19, 1906. Serial No. 312,647.

*To all whom it may concern:*

Be it known that I, FRANK STREICH, a citizen of the United States, residing at Joliet, in the county of Will and State of Illinois, have invented certain new and useful Improvements in Long-Loaf-Molding Machines, of which the following is a specification.

This invention relates to improvements in machines for molding dough in the art of bread making and the especial object of the improvements which form the subject matter of this application for patent is to provide a machine of economical construction and of simple operation that will transform an irregular shaped lump of dough into a cylindric form by first flattening the piece of dough and then coiling and rolling it into the shape desired.

In the accompanying drawing which forms a part of this application I have shown a preferred adaptation of my invention in the following views:—

Figure 1:
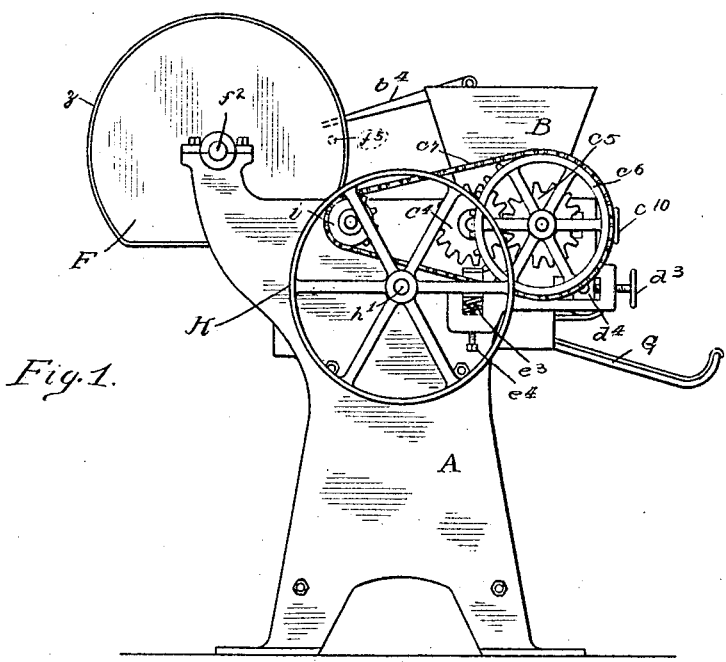
Figure 2:
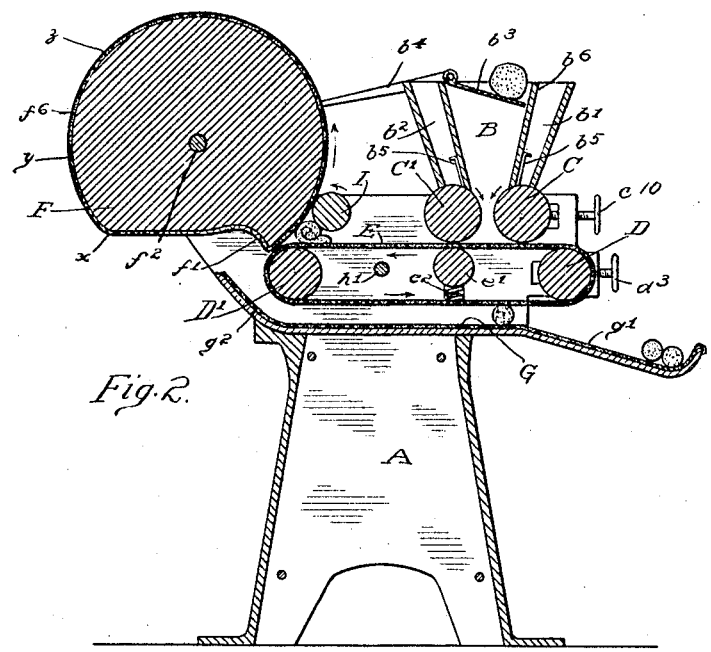
Figure 3:
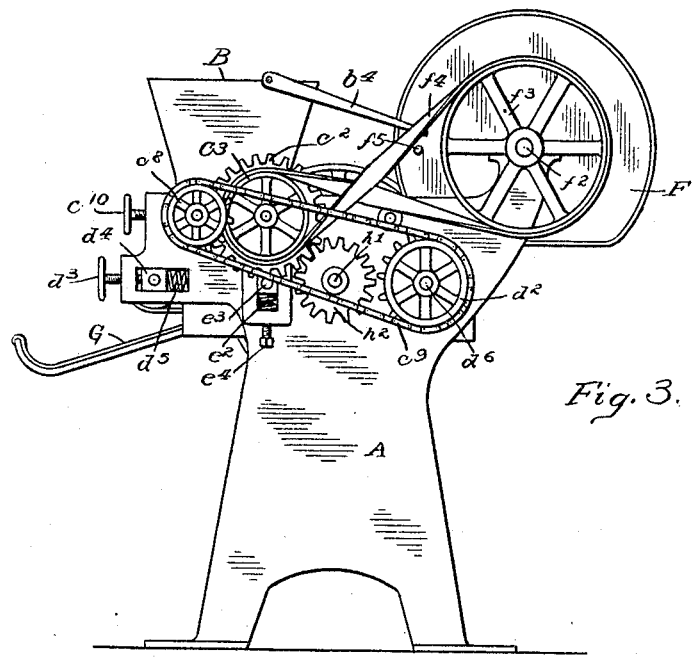
Figure 4:
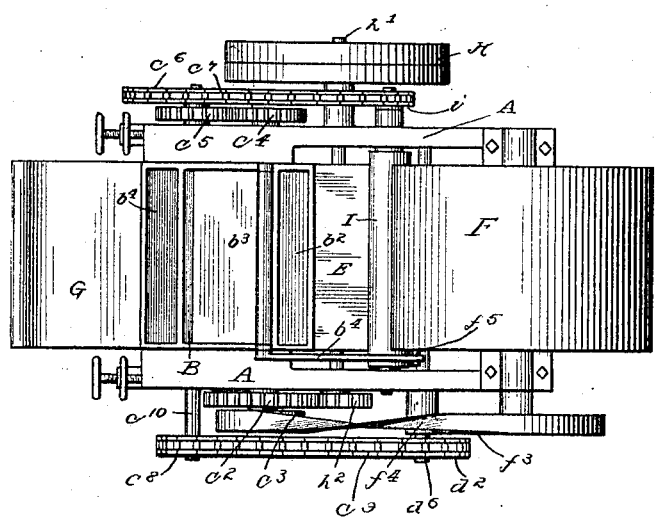

Figure 1 is a side elevation of a machine constructed according to my invention; Fig. 2 is a longitudinal section of said machine; Fig. 3 is a side elevation taken at the side opposite from that shown in Fig. 1, and Fig. 4 is a top plan view of the machine.

Referring to the details of the drawing, A represents a suitable supporting frame on which the various parts of the machine are mounted, journaled and secured.

B represents a hopper in which are two chambers $b^1$, $b^2$, formed by vertical partitions $b^6$, $b^6$, extending across the hopper and spaced from the end walls of same as clearly shown in Fig. 2. To these partitions are secured knives or scrapers $b^5$. Arranged below the open bottom of the hopper and chambers $b^1$, $b^2$, are two feed rollers C, $C^1$, the spindles of which are suitably journaled in the frame of the machine. A spindle of the roller C is adjustably mounted in a block the position of which is controlled by the screw $c^{10}$ in a well known manner, thus providing for regulating the space between said rollers.

Journaled in the frame in a plane below the rollers $c$, $c^1$, are three other rollers D, $D^1$ and $e^1$. The last named roller is adjustably and yieldingly journaled in a block $e^3$ which is supported by coiled springs $e^2$ and the blocks are vertically adjustable in their bearings by screws $e^4$. The spindle is journaled in blocks $d^4$ which are horizontally adjustable in the frame by means of screws $d^3$. Coiled springs $d^5$ press outwardly against the blocks $d^4$ and thus hold the rollers D under tension. Arranged to travel over the rollers D, $D^1$ and $e^1$, is an endless belt E which extends substantially the full width of said rollers.

Journaled in the frame at a point above the roller $D^1$, is an idler roller I the face of which is in contact with or near the surface of a drum F which is mounted on a shaft $f^2$ journaled in the extension of the frame of the machine. This drum has a segment cut therefrom to form a recess $f^1$, and the face of the drum is covered with a fabric $f^6$. Below the endless belt E and spaced therefrom a suitable distance, is a fabric covered table G having a downwardly extending portion $g^1$ and an upwardly extending portion at the opposite end, as $g^2$.

Pivoted on the upper edge of the hopper is a shutter $b^3$ which projects into and partially covers the center chamber of the hopper B and extending rearwardly from the shutter $b^3$ is an arm $b^4$ which is arranged in the path of a pin $f^5$ projecting from one side of the drum F. The weight of the arm $b^4$ is sufficient to counterbalance the weight of the shutter $b^3$ and a lump of dough placed on such shutter.

On the shaft $h^1$ are mounted tight and loose pulleys H adapted to be driven from any suitable power. On the opposite end of this shaft is a pinion $h^2$ which meshes with the pinion $c^2$ secured on one end of the shaft of the roller $C^1$. On the opposite end of the shaft of said roller is a pinion $c^4$ which meshes with the pinion $c^5$ mounted on one end of the shaft $c^{11}$. On the opposite end of the shaft $c^{11}$ is a sprocket gear $c^8$ on which travels a chain $c^9$ which also travels on a sprocket $d^2$ on one end of the shaft $d^6$. On the end of the shaft $c^{11}$ adjacent to the pinion $c^5$, is a sprocket wheel $c^6$ on which is mounted a chain $c^7$ which travels over a sprocket $i$ secured on the spindle of the roller I. On the shaft $f^2$ at one side of the drum is mounted a belt pulley $f^3$ over which travels a crossed belt $f^4$ which also travels over the pulley $c^3$ on the shaft or spindle of the roller $c^1$.

The operation of a machine constructed substantially as described will be as follows:— Upon power being applied to the tight pulley H, the shaft $h^1$ will be driven thus rotating the pinion $h^2$, pinion $c^2$, pulley $c^3$, thus driving the belt $f^4$, pulley $f^3$, and the drum F. The shaft on which the pinion $c^2$ is mounted being driven, in turn rotates the pinion $c^4$ and pinion $c^5$ on the shaft $c^{10}$. The sprocket $c^6$ and chain $c^7$ driven by the shaft $c^{10}$ will in turn drive the sprocket $i$ on the spindle of the roller I. The sprocket $c^8$ on the opposite end of the shaft $c^{10}$ being rotated by said shaft, will, through the chain $c^9$, drive the sprocket $d^2$ on the shaft $d^6$ and thus rotate the roller $D^1$ secured on said last named shaft. The rotation of the drum F through the pin $f^5$ will at intervals trip the arm $b^4$ and thus depress the shutter $b^3$ and permit a lump of dough placed on said shutter by the operator to drop through the chute between the rollers C, $C^1$, and the rotation of said rollers will draw the lump downwardly between same upon the endless belt E by which it will be carried under the roller $C^1$ thereby flattening said piece of dough so that when it reaches the drum F, (which is rotating in the direction indicated by the arrow in Fig. 2) the forward edge of the piece of dough will come in frictional contact with the surface of the drum and will be turned upwardly until it meets the under surface of the roller I, which is rotating in the direction indicated by the arrow, and thus the lump of dough will be coiled into a cylindrical form indicated in said figure and will be rotated by the combined action of said drum and roller until the surface of the dough is smooth. When the drum in the course of its rotation, presents the cutaway portion $f^1$ opposite the lump of dough, the opening thereby presented will permit the belt E to carry the dough downwardly upon the table G and along the surface of said table until it reaches the downwardly inclined portion $g^1$ when the dough cylinder thus formed will roll by gravity to position to be removed by the operator.

It will be apparent that through the adjustability of the idler roller $e^1$ the extent of the flattening of the lump of dough between the endless belt E and the roller $C^1$ may be fully controlled.

It will also be apparent that the extent of the frictional contact between the surface of the drum F and the dough will largely determine the degree of smoothness of the said piece of dough. In operating the machine, if it be desired to have the entire operative surface of the drum frictionally engage the piece of dough, the operator will so adjust the parts that when the dough reaches the drum it will be engaged at the point $x$, and if less frictional contact is desired it will begin at the points $y$ or $z$. This is an important feature in the operation of this machine in view of the fact that dough varies in its density, some batches requiring more working or molding than others. In the manufacture of my machine the drum will be of such diameter as to provide sufficient frictional contact for the quality of dough requiring the greatest amount of molding and when less frictional contact is required the operation will be as above described.

In the compartments $b^1$, $b^2$, flour will be placed to cover the rollers C, $C^1$, and thus prevent any of the dough from sticking to said rollers or the belt E. While the frictional contact between the face of the drum and the dough may be sufficient when the drum is made of wood or metal, I have found the best results obtained by covering the face of the drum with canvas.

It is obvious that a plurality of segments may be removed from the drum thus increasing the number of recesses $f^1$, and providing for a greater number of lumps of dough passing the drum at these points. The distance between the belt E and the table G will be such as to provide contact with the cylindrical lump of dough and thus feed said lump forward and at the same time tighten the coil formed by the drum, belt and roller I, above described, so that when the lump is removed it will be thoroughly molded and have a smooth exterior.

Having thus described my invention what I claim, is:—

1. In a dough molding machine, a supporting frame, a hopper, means for feeding the dough from the hopper, means for flattening the dough, and a drum having a transverse recess in its periphery, and means coöperating with said drum for coiling the pieces of dough into cylindrical form.

2. A dough molding machine comprising a supporting frame, a hopper, means for intermittently feeding lumps of dough to the hopper, rollers adapted to feed the lumps from the hopper, a belt traveling below said rollers and adapted to coöperate with said rollers in flattening the lumps, a drum and a roller coöperating with said belt in coiling the flattened lumps, said drum adapted to release the lumps from said roller and belt, and means for operating said rollers, belt and drum.

3. In a dough molding machine, a hopper, rollers adapted to feed the dough from said hopper, an endless belt arranged to coöperate with one of said rollers to flatten the dough, and a drum having a portion of its periphery adapted to frictionally engage the dough and having a portion adapted to provide a pocket to receive the dough and release it from frictional engagement.

4. In a dough molding machine, a hopper, rollers adapted to feed the dough from the hopper, an endless belt traveling below said rollers, means for pressing the upper course of said belt toward one of said rollers whereby a piece of dough may be flattened between the belt and said rotatable roller, means coöperating with said belt for coiling up the flattened pieces of dough, said means adapted to release the pieces when coiled, and means coöperating with said belt for maintaining the piece in its coiled condition.

5. In a dough molding machine, a hopper, rollers adapted to feed the dough from said hopper, an endless belt arranged below said rollers, means for driving said belt, a roller mounted below under the upper course of said belt and below one of the feed rollers, a friction roller and a drum, said drum and friction roller arranged and adapted to coöperate with said belt in coiling the dough presented thereto, and said drum adapted to release the dough from contact therewith.

6. In a dough molding machine, a hopper, feed rollers, a belt mounted below and adapted to receive the lumps of dough from said rollers, and arranged to coöperate with one of said rollers in flattening the lumps of dough, and a roller adjustably mounted relative to said belt, and the rotatable means coöperating with said belt for rolling said flat lumps of dough into cylindrical form.

In testimony whereof I affix my signature in presence of two witnesses.

FRANK STREICH.

Witnesses:
 EUGENE H. GARNETT,
 F. BENJAMIN.